UNITED STATES PATENT OFFICE.

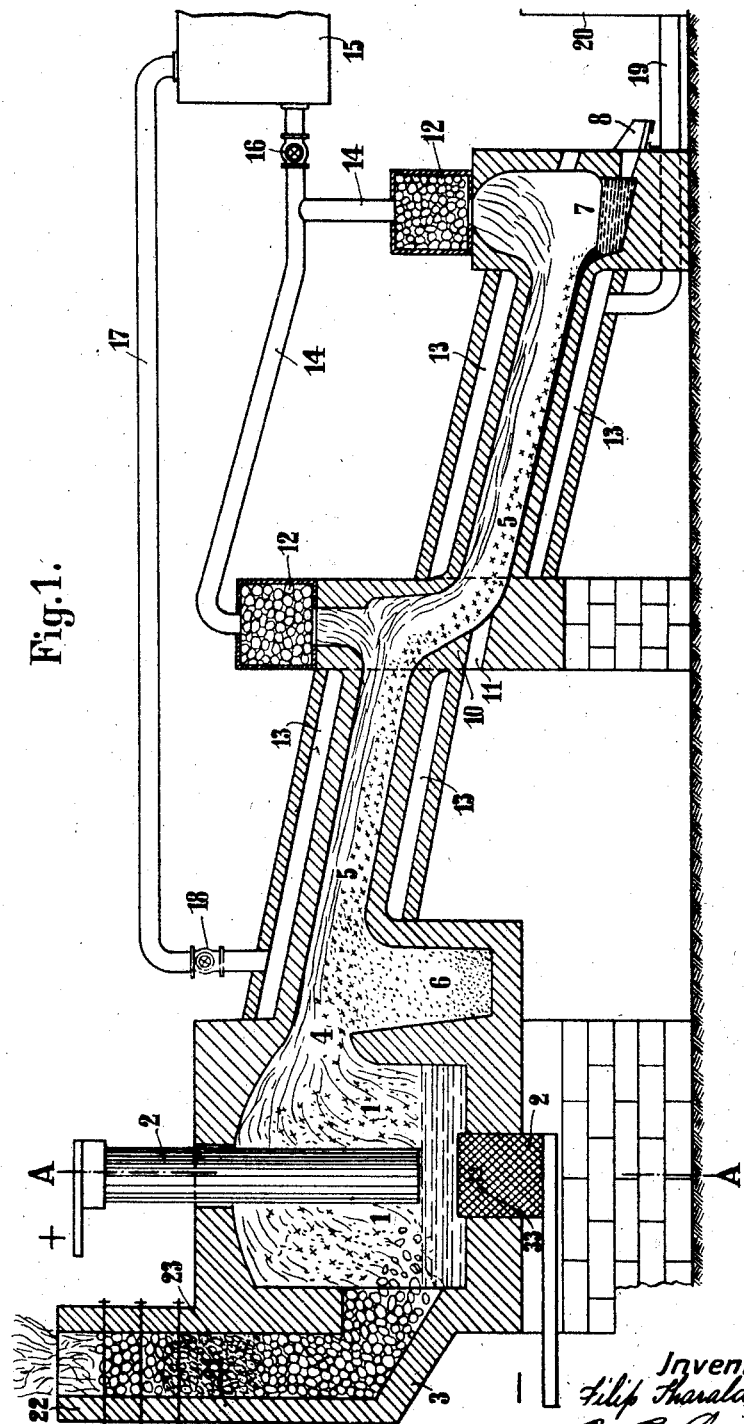

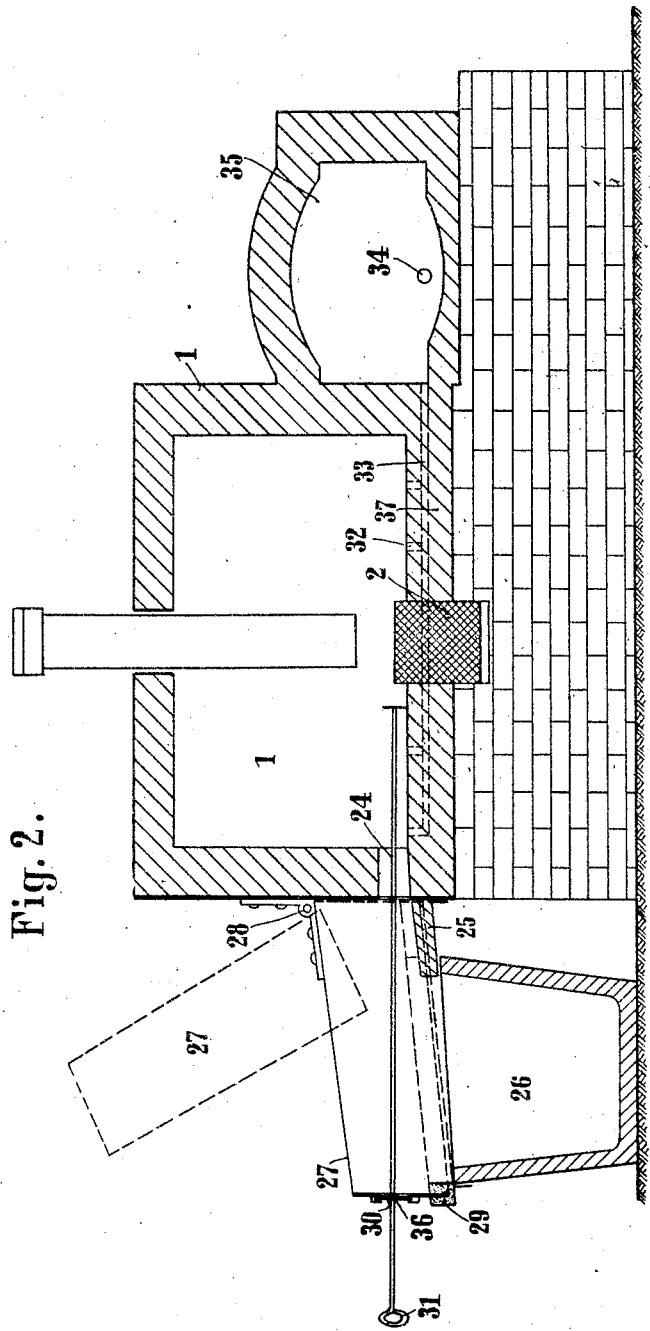

FILIP THARALDSEN, OF TRONDHJEM, NORWAY.

ELECTRIC FURNACE.

1,417,953.     Specification of Letters Patent.    Patented May 30, 1922.

Application filed March 1, 1915. Serial No. 11,423.

(GRANTED UNDER THE PROVISIONS OF THE ACT OF MARCH 3, 1921, 41 STAT. L., 1313.)

*To all whom it may concern:*

Be it known that I, FILIP THARALDSEN, a subject of the King of Norway, and resident of Trondhjem, Mellemilen, 48a, Norway, have invented certain new and useful Improvements in Electric Furnaces, of which the following is a specification.

The present invention relates to an electric furnace for the production and condensation of volatile metals, in particular zinc.

The disadvantages of the hitherto known furnaces are many and varied. They primarily consist in that only a comparatively small part of the metal produced is obtained in a molten state, while a great part is precipitated in form of the so called "zinc dust." Furthermore it is difficult in the electric furnace to maintain the condensation temperature, which lies between 430° and 560° Cent., at the proper height, because the considerable quantities of zinc, which the continuously working electric furnace produces, have to be condensed simultaneously.

Also the separation of the zinc vapors from the other volatile products of the process, which separation is highly important for the recovery of the zinc in a molten state, meets with great difficulties. This is a serious drawback, because the admixture of foreign gases also produces a tendency to form "zinc dust."

A further great disadvantage lies in the frequently inferior quality of the electrically produced zinc, which often can not be considered as "fine zinc" because it contains a large percentage of lead.

Lastly, a considerable part of the zinc is lost in the slag, which in the electric furnace is formed on the molten zinc and is simply run off after the known methods, when a certain quantity has accumulated.

It is the object of the present invention to obviate these disadvantages. For the purpose of securing a satisfactory condensation, the current of gaseous products proceeding from the electric furnace is therefore conducted through downwardly inclined conduits or tubes and the like of such capacity, that the zinc vapors segregate from the gas mixture, so that the precipitation of the zinc as liquid metal is ensured, while the non-condensible gases escape through ventilating shafts which are provided in the condensating conduits. For compensating the fluctuations in the working of the furnace the ventilating shafts are filled with pieces of suitable sealing material.

For the purpose of securing the proper condensation temperature in the conduits, the latter are surrounded by chambers, wherein the temperature is regulable. This has the following reason: When the zinc changes from its vaporous state into a liquid state, naturally the entire vaporization heat is liberated. Furthermore considerable quantities of heat are released by the gases, emerging from the furnace at a high temperature, while being reduced to the condensation temperature. The main point is, to achieve an equalization between the temperature of the condensing conduits and the outside atmospheric temperature. This is obtained by the provision of the chambers with regulable temperature, which surround the condensing conduits.

The separation of the zinc vapors from the other gaseous products of the process is further improved by giving the charge, introduced into the feed shaft, a certain height, and by regulating the size and the shape of the pieces of the charge. It is thereby obtained that the zinc vapors are retained in the charge, which, if properly dimensioned according to the respective conditions, will act as an excellent filter at low levels in the feed shaft and there separate the zinc vapors from the other gaseous products of the process.

In order to obtain zinc of as great a pureness as possible, and above all, to reduce the percentage of lead contained in the zinc to a minimum, a system of channels is provided beneath the bottom of the hearth; these channels communicate with a chamber at the side of the furnace wherefrom the lead accumulating at the bottom of the metallic bath and thence conducted by the said channels into the chamber is drawn off from time to time.

The slag, which gathers on the surface of the zinc bath is drawn off, from time to time, into slag tubs; the contents of these tubs are, under addition of reducing agents, submitted to a reducing treatment, so that the zinc is recoverd in a vaporous state.

For preventing the access of air to the furnace through the operating holes, such as are required for an instance for drawing off the slag, these holes are provided with hinged lids, which are fitted with adjustable operating slots and are hermetically connected by aid of packing-rings to the slag tubs.

Fig. 1 represents a vertical section of a furnace, embodying my invention.

Fig. 2 represents a vertical section on the line A—A of Fig. 1.

The production of the zinc is effected by means of the two electrodes 2 in the furnace 1. The charge is supplied through the feed shaft 3, as pieces of a certain shape and size. The height, to which the charge is piled, may be varied by extensions 22, being placed on the shaft. At a certain height, indicated in Fig. 1 by the numeral 23, the metal segregates from the other gaseous products, is there condensed and flows back into the furnace.

The gases produced by the working of the furnace pass through the opening 4 into the inclined conduit 5. Behind the opening 4 an enlarged chamber 6 follows, whereby the velocity of the gases escaping from the furnace, is considerably reduced. In consequence thereof the dust particles, which are carried along with the gases, are able to settle down.

The gases, now freed from dust, and almost completely composed of zinc vapor, carbon-oxide and carbonic acid pass along the conduit 5. During this passage the zinc vapors—indicated in the drawing by crosses—segregate and gradually condense to molten zinc. The conduits are so dimensioned, that the main part of the zinc vapors has been segregated, as soon as the condensation temperature of the zinc has been reached. The zinc, which gradually accumulates in a molten state, flows to the sump 7, whence it is drawn off through the hole 8.

The condensing conduit has one or several turns 10, in which cleaning holes 11 are provided.

In the condensing conduit are further provided ventilating shafts 12, which are filled with a suitable sealing material preferably coke, in pieces of a suitable size, in order to compensate the fluctuations in the pressure of the furnace and to absorb any zinc, which may still be contained in the escaping gases.

The condensing conduit 5 is surrounded by a heat compensating chamber 13. The gases escaping from the ventilating shafts 12 are conducted through pipe 14 to the boiler 15 and there burnt. The hot waste gases are conducted through pipe 17 to the heat compensating chamber 13 and thence pass through pipe 19 to the chimney 20.

The valves 16 and 18 are provided for regulating the respective quantities of the hot waste gases, and thereby also the temperature in the heat compensating chambers 13.

In the sole 37 (Fig. 2) of the furnace a system of channels 32, 33 is provided, which communicates with the chamber 35. The latter is provided with a drawing-off hole 34, through which the lead, accumulating in the said conduits 32, 33 and passing thence into the chamber 35, is drawn off.

The slag, which is formed in the furnace, is let off from time to time through opening 24, into the slag tubs 26. In order to prevent the air from entering during this operation, a hinged lid 27 swinging on a fulcrum 28, is provided. This lid engages with its front wall in a gutter 29 extending around the rim of the tub 26.

The tub 26 is further sealed by the projection 25 extending from the furnace.

The hinged lid 27 is provided with an operating slot 36, which is filled with sliding shutters 30. Through this operating slot the necessary tools, such as scraper 31 are introduced.

The slag, which has been let off into the tube 26 is reduced under addition of suitable reducing agents, after a suitable hood has been placed on the tub.

The last described arrangement is also suitable for electric zinc refining furnaces, where the zinc, after being enriched in lead, is drawn off periodically, without there being any danger of air entering into the furnace.

I claim:

1. Electric furnace for producing and condensing volatile metals particularly zinc, consisting of a furnace chamber, electrodes projecting into said chamber, a downwardly inclined condensing conduit communicating with said furnace chamber, a dust-collecting chamber between the furnace chamber and the condensing conduit, and a plurality of ventilating shafts arranged one after the other and extending at intervals through the entire length of said condensing conduit.

2. Electric furnace for producing and condensing volatile metals, in particular zinc, consisting of a furnace chamber, electrodes projecting into said chamber, a feed shaft provided with extensions, a downwardly inclined condensing conduit, communicating with the furnace chamber, a dust collecting chamber between the furnace chamber and the condensing conduit, ventilating shafts, provided in the condensing conduit, a chamber with regulable temperature surrounding the condensing conduit, and means for conducting the gases from the ventilating shafts to a place for their combustion and thence to the chamber, surrounding the condensing conduit.

3. Electric furnace for producing and condensing volatile metals, in particular zinc, consisting of a furnace chamber, a system of vertical and horizontal channels for carrying off the lead, arranged in the base of the said furnace chamber, a chamber arranged at the side of the furnace and in communication with the said channels, electrodes projecting into the said furnace chamber, a feed shaft with extensions, a downwardly inclined condensing conduit, communicating with the said furnace chamber, a dust collecting chamber between the said furnace chamber and the condensing conduit, ventilating shafts provided in the condensing conduit, a chamber with regulable temperature surrounding the condensing conduit, and means for conducting the gases from the ventilating shafts to a place for their combustion and thence to the chamber surrounding the condensing conduit.

4. Electric furnace for producing and condensing volatile metals, in particular zinc, consisting of a furnace chamber, a system of vertical and horizontal channels for carrying off the lead arranged in the base of the said furnace chamber, a chamber arranged at the side of the furnace and in communication with the said channels, electrodes, projecting into the said furnace chamber, a feed shaft having extensions, a downwardly inclined condensing shaft communicating with the furnace chamber, a dust collecting chamber between the furnace chamber and the condensing conduit, ventilating shafts provided in the condensing conduit, a chamber with regulable temperature surrounding the condensing conduit, means for conducting the gases from the ventilating shafts to a place for their combustion and thence to the chamber surrounding the condensing conduit, a hinged lid in front of the outlet for drawing off the slag, an operating slot, adjustably arranged in the front wall of the said lid by means of sliding shutters.

5. Electric furnace for producing and condensing volatile metals, in particular zinc, consisting of a furnace chamber, a system of vertical and horizontal channels for carrying off the lead, arranged in the base of the said furnace chamber, a chamber arranged at the side of the furnace and in communication with the said channels, electrodes projecting into the said furnace chamber, a feed shaft having extensions, a downwardly inclined condensing shaft communicating with the furnace chamber, a dust collecting chamber between the furnace chamber and the condensing conduit, ventilating shafts provided in the condensing conduit, a chamber with regulable temperature surrounding the condensing conduit, means for conducting the gases from the ventilating shafts to a place for their combustion and thence to the chamber surrounding the condensing conduit, and a hinged lid in front of the outlet for drawing off the slag and an operating slot, adjustably arranged in the front wall of the said lid, by means of sliding shutters, the said front wall engaging in a hermetically sealing gutter, extending along the outer edge of the slag tub.

In testimony whereof I affix my signature in presence of two witnesses.

FILIP THARALDSEN.

Witnesses:
HENRY HASPER,
WALDEMAR HAUPT.